(12) United States Patent
Chen et al.

(10) Patent No.: US 7,440,824 B2
(45) Date of Patent: Oct. 21, 2008

(54) VEHICLE STABILITY CONTROL WITH LATERAL DYNAMICS FEEDBACK

(75) Inventors: Shih-Ken Chen, Troy, MI (US); Jihan Ryu, Sterling Heights, MI (US); Nikolai K. Moshchuk, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 528 days.

(21) Appl. No.: 11/280,943

(22) Filed: Nov. 16, 2005

(65) Prior Publication Data

US 2007/0112474 A1    May 17, 2007

(51) Int. Cl.
*G06F 19/00* (2006.01)
(52) U.S. Cl. ............................. 701/1; 701/70
(58) Field of Classification Search ........... 701/1, 701/36–38, 70–72, 84; 180/197
See application file for complete search history.

(56) References Cited

U.S. PATENT DOCUMENTS

| 5,720,533 | A | 2/1998 | Pastor et al. |
| 6,035,251 | A | 3/2000 | Hac et al. |
| 6,122,584 | A | 9/2000 | Lin et al. |
| 6,819,998 | B2 | 11/2004 | Lin et al. |
| 7,274,984 | B2 * | 9/2007 | Shin et al. ............... 701/70 |

* cited by examiner

*Primary Examiner*—Yonel Beaulieu

(57) ABSTRACT

A system and method for estimating vehicle side-slip velocity that includes measuring the lateral acceleration of the vehicle, measuring the yaw rate of the vehicle, measuring the longitudinal speed of the vehicle and measuring the steering angle of the vehicle. The measured longitudinal speed is corrected to provide a true longitudinal speed using a filter factor based on the vehicle-dependent parameters and a steering angle. A constant is defined based on the measured longitudinal speed and a function is defined based on the combination of the vehicle-dependent parameters and the lateral acceleration. Side-slip acceleration is calculated using the measured lateral acceleration, the true longitudinal speed, the yaw rate, the constant and the function.

24 Claims, 3 Drawing Sheets

VEHICLE STABILITY CONTROL WITH LATERAL DYNAMICS FEEDBACK

BACKGROUND OF THE INVENTION

1. Field of the Invention

This invention relates generally to a system for estimating vehicle side-slip and, more particularly, to a system for estimating vehicle side-slip that uses vehicle lateral acceleration and vehicle-dependent parameters.

2. Discussion of the Related Art

Various vehicle stability control systems are known in the art that improve driver convenience, safety and comfort. These stability control systems typically employ differential braking and/or active front and rear wheel steering to provide the stability control. The stability control systems generally operate within a linear vehicle operating region, where vehicle states define the behavior of the vehicle. The vehicle states are generally determined from measured parameters, such as vehicle yaw rate, vehicle longitudinal velocity and vehicle lateral velocity.

Vehicle side-slip velocity is one of the key states for determining vehicle dynamics, kinematics and control for these types of stability control systems. Vehicle side-slip velocity is defined as the lateral speed at the vehicle's center of gravity in a direction perpendicular to the vehicle longitudinal velocity. The vehicle side-slip velocity combined with the vehicle longitudinal velocity defines a vehicle vector velocity in the vehicle traveling direction. However, the measurement of vehicle side-slip angle, which requires a measurement of vehicle side-slip velocity, requires special sensors that are very expensive. Therefore, vehicle stability control systems typically estimate vehicle side-slip velocity. Particularly, vehicle control systems calculate the vehicle side-slip velocity to determine an error so that the vehicle can be controlled to reduce the side-slip error to zero. However, vehicle side-slip velocity is difficult to accurately calculate because it is typically very small within the linear operating region of the vehicle.

One known method for estimating vehicle side-slip velocity that uses limited-bandwidth integration is disclosed in U.S. Pat. No. 6,819,998, titled Method and Apparatus for Vehicle Stability Enhancement System, issued Nov. 16, 2004 to Lin et al., assigned to the Assignee of this invention and herein incorporated by reference. As a result, reasonably accurate side-slip estimations can be provided without expensive side-slip velocity sensors. However, improvements can be made for estimating vehicle side-slip velocity.

SUMMARY OF THE INVENTION

In accordance with the teachings of the present invention, a system and method for estimating vehicle side-slip velocity using vehicle lateral acceleration and vehicle-dependent parameters is disclosed. The method includes measuring the lateral acceleration of the vehicle, measuring the yaw rate of the vehicle, measuring the longitudinal speed of the vehicle and measuring the steering angle of the vehicle. The measured longitudinal speed of the vehicle is corrected to provide a true longitudinal speed using a filter factor based on the vehicle-dependent parameters and the steering angle. A constant is defined based on the measured longitudinal speed of the vehicle and a function is defined based on a combination of the vehicle-dependent parameters and the lateral acceleration of the vehicle. Side-slip acceleration is calculated using the measured lateral acceleration, the true longitudinal speed, the yaw rate, the constant and the function.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for estimating vehicle side-slip velocity is merely exemplary in nature, and is in no way intended to limit the invention or its applications or uses.

Figure 1:
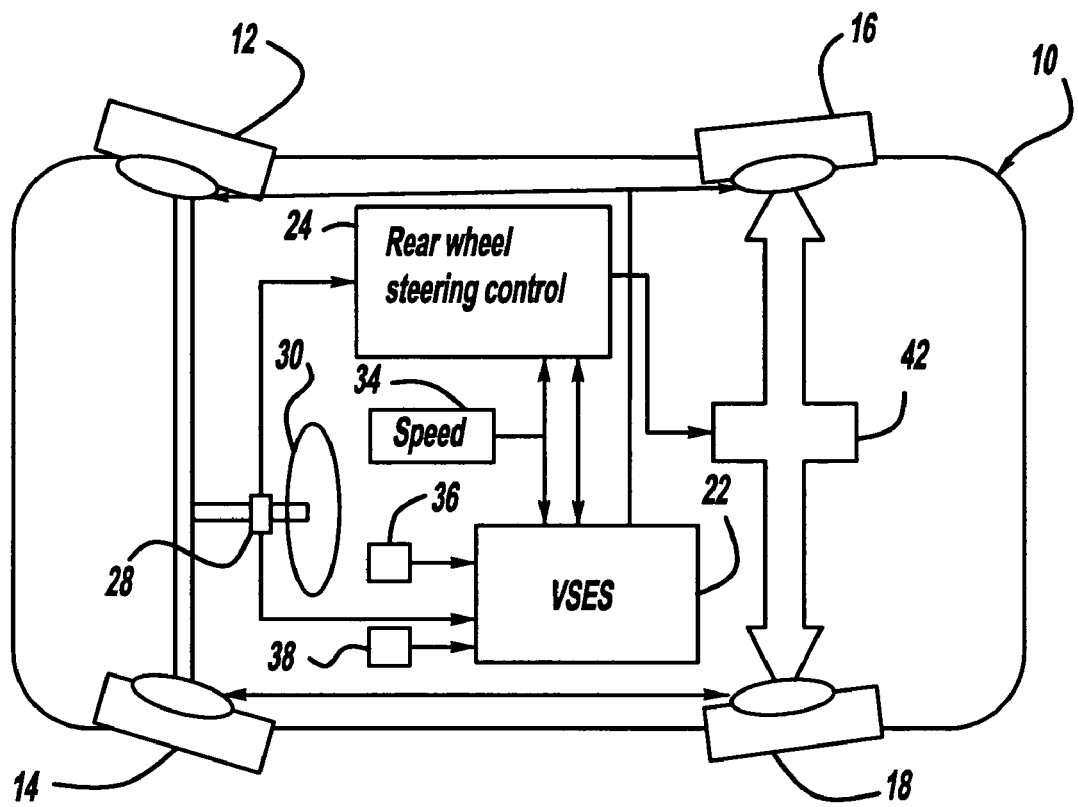
FIG. 1 is a plan view of a vehicle including a rear-wheel steering control system and a vehicle stability enhancement system.

FIG. 1 is a plan view of a vehicle 10 including front wheels 12 and 14 and rear wheels 16 and 18. The vehicle 10 includes vehicle stability control provided by a vehicle stability enhancement system (VSES) 22 and a rear-wheel steering control system 24. The vehicle 10 includes sensors for measuring various vehicle states, including a hand-wheel angle sensor 28 for measuring the angle of a vehicle hand-wheel 30 to provide a signal indicative of the steering angle for steering the front wheels 12 and 14. Further, the vehicle 10 includes a speed sensor 34 for providing a signal indicative of the vehicle longitudinal speed, a yaw rate sensor 36 for providing a signal indicative of the yaw rate of the vehicle 10 and a lateral acceleration sensor 38 for providing a signal indicative of the lateral acceleration of the vehicle 10. The VSES 22 receives the hand-wheel angle signal, the longitudinal speed signal, the vehicle yaw rate signal and the vehicle lateral acceleration signal, and uses a stability control algorithm based on the measured signals and other vehicle parameters to provide differential braking to the wheels 12-18, and thus, stability control for the vehicle 10. Many suitable control algorithms are known in the art that provide stability control to reduce vehicle roll, side-slip, etc.

The rear-wheel steering control system 24 receives the hand-wheel angle signal and the longitudinal speed signal to provide a rear-wheel command signal to a rear-wheel steering actuator 42 to steer the rear wheels 16 and 18. Many suitable control algorithms are known in the art, both open-loop and closed-loop including feedback, to provide rear-wheel steering assist.

As mentioned above, vehicle side-slip velocity is one of the vehicle parameters used in most, if not all, vehicle stability systems. As will be discussed in detail below, the present invention proposes a new technique for calculating an estimation of the vehicle side-slip velocity using a filtering factor based on vehicle-dependent parameters and lateral acceleration.

Figure 2:
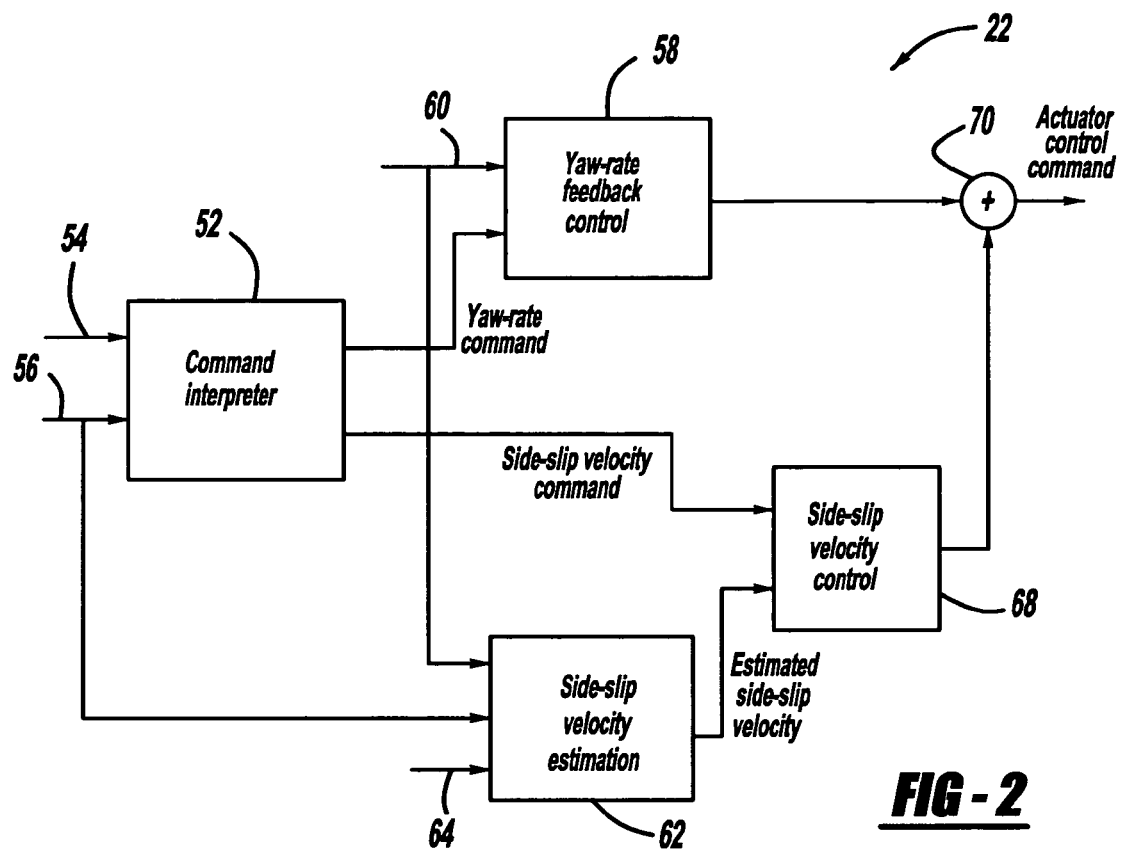
FIG. 2 is a block diagram of the vehicle stability enhancement system shown in FIG. 1 including a side-slip velocity estimation processor, according to an embodiment of the present invention.

FIG. 2 is a block diagram of the VSES 22. The VSES 22 includes a command interpreter 52 that receives the hand-wheel angle signal from the hand-wheel angle sensor 28 on line 54 and the longitudinal speed signal from the vehicle speed sensor 34 on line 56. The command interpreter 52 provides a desired yaw-rate command signal and a desired side-slip velocity command signal based on the hand-wheel angle signal and the longitudinal speed signal. Various algorithms are known in the art for providing the yaw-rate command signal and the desired side-slip velocity command signal in a command interpreter of this type. U.S. Pat. No. 6,122,584, titled Brake System Control, issued Sep. 19, 2000 to Lin et al., discloses a command interpreter that calculates a desired side-slip velocity that can be used for determining the desired side-slip velocity command signal.

The VSES 22 also includes a yaw-rate feedback control processor 58 that receives the yaw rate signal from the yaw-rate sensor 36 on line 60 and the yaw-rate command signal from the command interpreter 52. The yaw-rate feedback control processor 58 uses any suitable algorithm, many of which are known in the art, to provide a yaw-rate control component signal to minimize the difference between the measured vehicle yaw rate and the desired vehicle yaw rate.

The VSES 22 also includes a side-slip velocity estimation processor 62 that receives the yaw-rate signal on line 60, the longitudinal speed signal on line 56 and the lateral acceleration signal from the lateral acceleration sensor 38 on line 64. The side-slip estimation processor 62 generates an estimated side-slip of the vehicle 10 in a new and novel manner based on an algorithm of the invention as will be discussed in detail below.

The VSES 22 also includes a side-slip velocity control processor 68 that receives the side-slip velocity command signal from the command interpreter 52 and the estimated side-slip velocity signal from the side-slip velocity estimation processor 62. The side-slip velocity control processor 68 generates a side-slip velocity control component signal to minimize the difference between the desired side-slip velocity of the vehicle and the estimated side-slip velocity of the vehicle.

The yaw-rate control component signal from the yaw-rate feedback control processor 58 and the side-slip velocity control component signal from the side-slip velocity control processor 68 are added by an adder 70 that generates the actuator control command that provides differential braking for the wheels 12-18 so that the measured yaw-rate signal is tracking the yaw-rate command signal and the estimated side-slip velocity signal is tracking the side-slip velocity command signal.

The '998 patent referenced above discloses a VSES that would employ a command interpreter, a yaw-rate feedback control processor, a side-slip velocity estimation processor and a side-slip velocity control processor. The present invention is an improvement over the VSES disclosed by the '998 patent because it calculates the side-slip velocity estimation signal differently in the side-slip velocity estimation processor 62.

Figure 3:
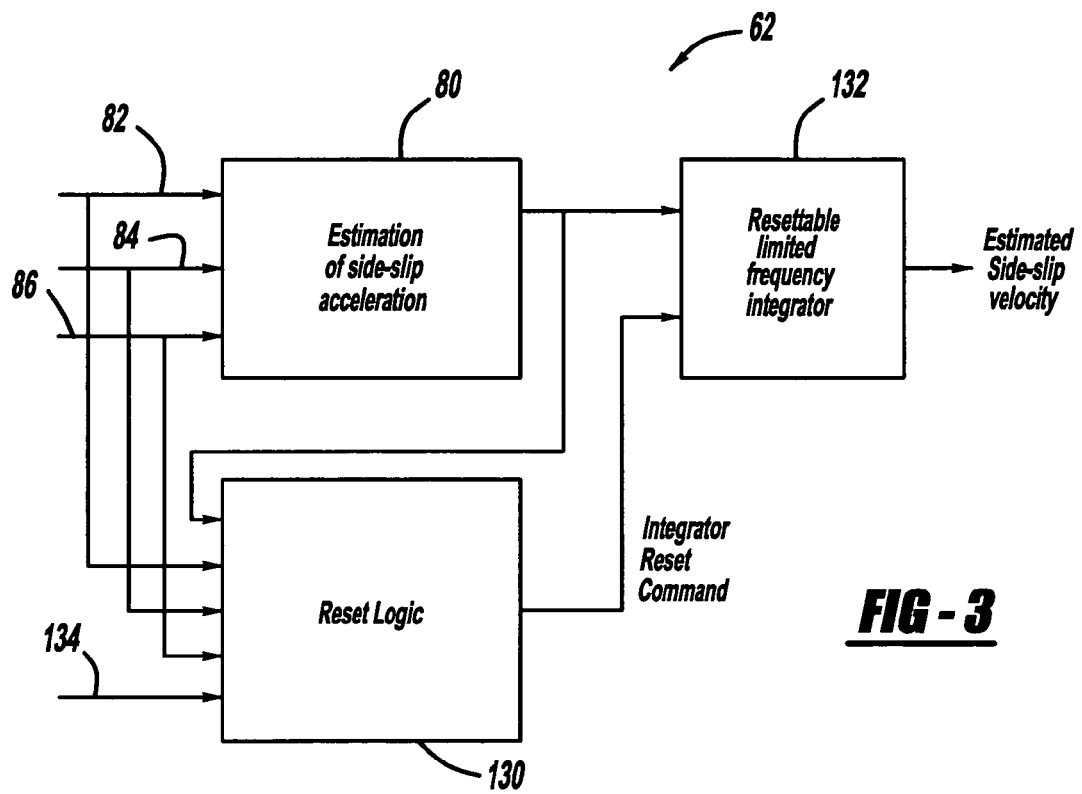
FIG. 3 is a block diagram of the side-slip velocity estimation processor shown in FIG. 2.

A more detailed block diagram of the side-slip velocity estimation processor 62 is shown in FIG. 3. An estimation of side-slip acceleration processor 80 receives the yaw-rate signal on line 82, the lateral acceleration signal on line 84 and the longitudinal speed signal on line 86. The estimation of side-slip acceleration processor 80 calculates an estimated side-slip acceleration signal $\dot{V}_{y\_estimated}$, as will be discussed below.

The processor 80 determines an error signal $E_{V_y}$ as the difference between the desired side-slip velocity signal $V_{y\_desired}$ from the command interpreter 52 and a feedback side-slip velocity signal $V_{y\_feedback}$ by the equation:

$$E_{V_y} = V_{y\_desired} - V_{y\_feedback} \qquad (1)$$

To determine the feedback side-slip velocity signal $V_{y\_feedback}$, the '998 patent proposes a method of limited-bandwidth integration of the measured side-slip acceleration $\dot{V}_{y\_measured}$ to compensate for the negative effects of sensor bias and noise. The true side-slip acceleration $\dot{V}_y$, with sensor bias B, can be represented as:

$$\dot{V}_y = A_{y\_measured} - r_{\_measured} V_{x\_measured} + B = \dot{V}_{y\_measured} + B \qquad (2)$$

Where $A_{y\_measured}$ is the lateral acceleration signal from the lateral acceleration sensor 38, $r_{\_measured}$ is the yaw-rate signal from the yaw-rate sensor 36, $V_{x\_measured}$ is the longitudinal speed signal from the vehicle speed sensor 34 and $\dot{V}_{y\_measured}$ is the measured side-slip acceleration of the vehicle 10.

Equation (2) can be converted to equation (3) as:

$$\dot{V}_{y\_measured} = A_{y\_measured} - r_{\_measured} V_{x\_measured} \qquad (3)$$

Equation (3) is valid when the vehicle is under limited roll and side-slip motion. When the intensity of either motion is increasing, the measured side-slip acceleration will exhibit an increasing error from the "true" vehicle side-slip acceleration. As a result, the estimated side-slip velocity based on integration of the estimated side-slip acceleration signal may also show an increase in error. Because the roll angle is not readily available from sensor measurements, the lateral acceleration information is used instead of the roll angle to account for the roll motion effect, according to the invention. To compensate for the roll motion effect, the present invention proposes to modify equation (3) as:

$$\dot{V}_{y\_estimated} = \dot{V}_{y\_measured} - kf(A_{y\_measured}) \qquad (4)$$

Where k is a constant and $f$ is a non-linear function of the measured lateral acceleration signal $A_{y\_measured}$.

Both the constant k and the function $f$ are vehicle dependent and can be derived experimentally. For a typical SUV, the speed-dependent values in Table I below can be used for the constant k.

TABLE I

| | Speed (kph) | | | | |
|---|---|---|---|---|---|
| | 0 | 40 | 80 | 100 | 140 |
| K | 1.2 | 1.2 | 1.1 | 1.0 | 0.9 |

The function $f$ is defined as having the following relationship to the measured lateral acceleration signal $A_{y\_measured}$ as:

$$f = \frac{b_1 A_{y\_measured} - b_2}{s^2 + a_1 s + a_2} \qquad (5)$$

Where $b_1, b_2, a_1, a_2$ are vehicle-dependent parameters that can also be derived experimentally and s is the Laplace operator.

For a typical SUV, the values in Table II for $b_1, b_2, a_1, a_2$ can be used depending on the measured lateral acceleration signal $A_{y\_measured}$.

TABLE II

| | $A_y$ measured (g) | |
|---|---|---|
| | <0.9 | >=0.9 |
| $b_1$ | 0.82 | 0.55 |
| $b_2$ | 0 | 5.91 |
| $a_1$ | 3.16 | 0 |
| $a_2$ | 73.57 | 0 |

Figure 4:
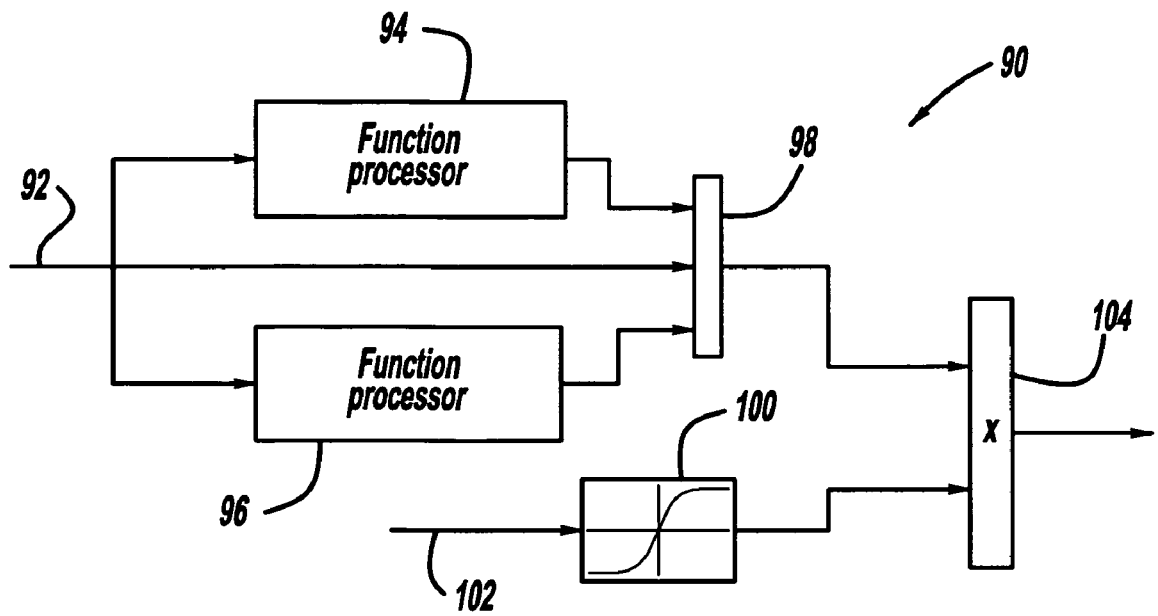
FIG. 4 is a block diagram of a sub-system for generating a filtering factor for determining the vehicle side-slip velocity estimation.

FIG. 4 is a block diagram of a sub-system 90 in the estimation of side-slip acceleration processor 80 for determining the product of the constant k and the function ƒ to determine the estimated side-slip acceleration signal $\dot{V}_{y\_estimated}$ in equation (4). The measured lateral acceleration signal $A_{y\_measured}$ from the lateral acceleration sensor 38 on line 92 is provided to a function processor 94, a function processor 96 and a switch 98. If the measured lateral acceleration signal $A_{y\_measured}$ is below 0.9 g, then the switch 98 switches to the output of the function processor 94 that generates the function ƒ using the values $b_1, b_2, a_1$ and $a_2$ in the first column of Table II. Likewise, if the measured lateral acceleration signal $A_{y\_measured}$ is greater than or equal to 0.9 g, then the switch 98 switches to the output of the function processor 96 that generates the function ƒ using the values for $b_1, b_2, a_1$ and $a_2$ in the second column of Table II. The longitudinal speed signal $V_{x\_measured}$ from the vehicle speed sensor 34 is provided to a look-up table 100 on line 102. The look-up table 100 provides the constant k from Table I based on the vehicle speed. The function ƒ from the switch 98 and the constant k from the look-up table 100 are applied to a multiplier 104 that multiplies the signals to provide a side-slip correction term for equation (4).

Figure 5:
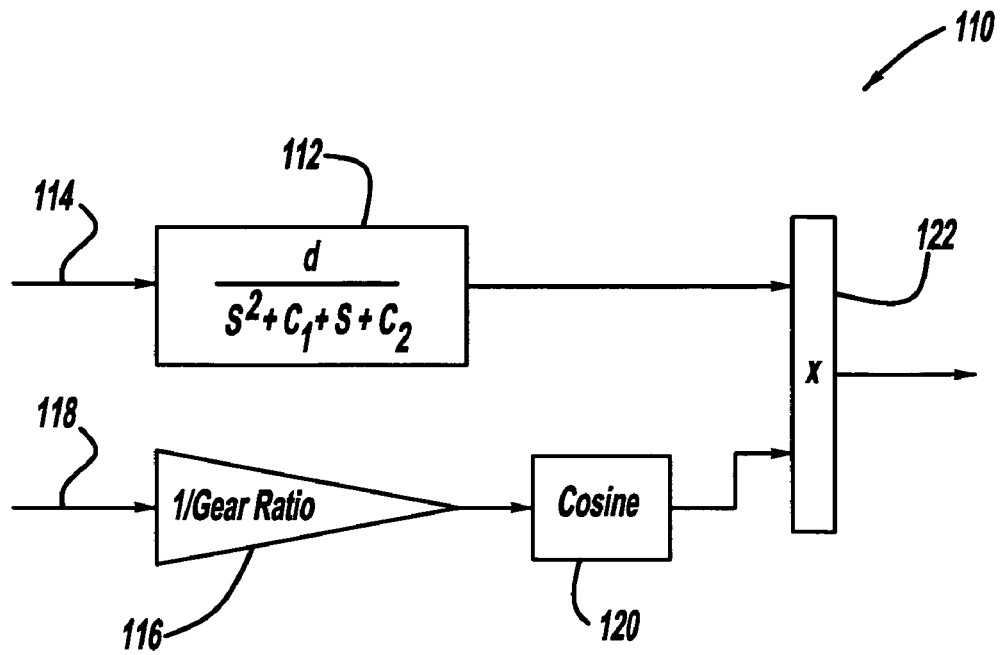
FIG. 5 is a block diagram of a sub-system for determining a true longitudinal speed value for determining the vehicle side-slip velocity estimation of the invention.

According to the invention, the longitudinal speed signal $V_{x\_measured}$ can be processed to consider the effect of large steering angles to provide a true longitudinal speed signal $V_{x\_true}$. FIG. 5 is a block diagram of a sub-system 110 in the estimation of side-slip acceleration processor 80 for calculating the final longitudinal velocity that takes into account the steering angle. The longitudinal speed signal $V_{x\_measured}$ is applied to a filter processor 112 on line 114. The filter processor 112 uses the following equation (6) to generate a filtered longitudinal speed signal $V_{x\_measured\_filter}$.

$$V_{x\_measured\_filter} = \frac{d}{s^2 + c_1 s + c_2} V_{x\_measured} \quad (6)$$

Where d, $c_1$ and $c_2$ are vehicle-dependent parameters. For a typical SUV, d=39.5, $c_1$=8.9 and $c_2$=39.5.

The filtered speed signal $V_{x\_measured\_filter}$ is then corrected using the steering angle to provide the actual vehicle longitudinal direction. Particularly, the hand-wheel angle signal from the hand-wheel angle sensor 28 is provided to a gear ratio gain processor 116 on line 118. The gain processor 116 adds a gear ratio gain to the hand-wheel angle signal for the front wheels 12 and 14. The steering angle signal from the gain processor 116 is then applied to a cosine processor 120 that provides the steering angle correction signal. The steering angle correction signal from the cosine processor 120 and the longitudinal filtered signal $V_{x\_measured\_filter}$ from the processor 112 are multiplied by a multiplier 122 to provide the true longitudinal speed signal $V_{x\_true}$.

The estimation of side-slip acceleration processor 80 then combines equations (4) and (5) with the true longitudinal speed signal $V_{x\_true}$ to provide an accurate estimation of the side-slip acceleration $\dot{V}_{y\_estimated}$ as:

$$\dot{V}_{y\_estimated} = A_{y\_measured} - r_{\_measured} V_{x\_true} - kf(A_{y\_measured}) \quad (7)$$

The output of the estimation of side-slip acceleration processor 80 is the estimated side-slip acceleration signal $\dot{V}_{y\_estimated}$. The estimated side-slip acceleration signal $\dot{V}_{y\_estimated}$ is then integrated by a frequency integrator 132 to give the estimated side-slip velocity. During those times that the vehicle 10 is not exhibiting side-slip, and the signal $\dot{V}_{y\_estimated}$ is near zero, the integration of the estimated side-slip acceleration signal in the frequency integrator 132 is reset to zero by a reset logic processor 130, as is well understood in the art. The reset logic processor 130 receives the hand-wheel angle signal on line 134.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating side-slip of a vehicle, said method comprising:
    measuring the lateral acceleration of the vehicle and providing a measured lateral acceleration signal;
    measuring the yaw rate of the vehicle and providing a measured yaw rate signal;
    measuring the longitudinal speed of the vehicle and providing a measured longitudinal speed signal;
    correcting the measured longitudinal speed signal to provide a true longitudinal speed signal;
    defining a constant based on the measured longitudinal speed signal;
    defining a function based on predetermined vehicle-dependent parameters and the measured lateral acceleration signal; and
    estimating the side-slip by combining the measured lateral acceleration signal, the measured yaw rate signal, the true longitudinal speed signal, the constant and the function.

2. The method according to claim 1 wherein estimating the side-slip includes using the equation:

$$\dot{V}_{y\_estimated} = A_{y\_measured} - r_{\_measured} V_{x\_true} - kf(A_{y\_measured})$$

where $\dot{V}_{y\_estimated}$ is estimated side-slip acceleration, $A_{y\_measured}$ is the measured lateral acceleration signal, $r_{\_measured}$ is the measured yaw rate signal, $V_{x\_true}$ is the true longitudinal speed signal, k is the constant and ƒ is the function.

3. The method according to claim 1 wherein correcting the measured longitudinal speed signal includes filtering the measured longitudinal speed signal using vehicle-dependent parameters to provide a filtered longitudinal speed signal.

4. The method according to claim 3 wherein filtering the measured longitudinal speed signal includes using the equation:

$$V_{\text{x\_measured\_filter}} = \frac{d}{s^2 + c_1 s + c_2} V_{\text{x\_measured}}$$

where $V_{x\_measured\_filter}$ is the filtered longitudinal speed signal, $V_{x\_measured}$ is the measured longitudinal speed signal, s is the Laplace operator and d, $c_1$ and $c_2$ are the vehicle-dependent parameters.

5. The method according to claim 3 wherein correcting the measured longitudinal speed signal further includes providing a steering angle correction to the filtered longitudinal speed signal.

6. The method according to claim 5 wherein correcting the longitudinal speed signal includes providing a hand-wheel signal indicative of the position of a vehicle hand-wheel, ratioing the hand-wheel signal to provide a ratio signal and multiplying the ratio signal by the filtered longitudinal speed signal.

7. The method according to claim 1 wherein defining the function includes using a first set of vehicle-dependent parameters if the measured longitudinal speed signal is below a predetermined value and using a second set of vehicle-dependent parameters if the measured longitudinal speed signal is greater than or equal to the predetermined value.

8. The method according to claim 1 wherein defining the function include using the equation:

$$f = \frac{b_1 A_{\text{y\_measured}} - b_2}{s^2 + a_1 s + a_2}$$

where $f$ is the function, $A_{y\_measured}$ is the measured lateral acceleration signal, s is the Laplace operator, and $a_1$, $a_2$, $b_1$ and $b_2$ are the vehicle-dependent parameters.

9. The method according to claim 1 wherein estimating the side-slip includes multiplying the constant and the function.

10. The method according to claim 1 wherein the method is used in a stability control system for the vehicle.

11. A system for estimating side-slip of a vehicle, said system comprising:
a lateral acceleration sensor for measuring the lateral acceleration of the vehicle and providing a measured lateral acceleration signal;
a yaw rate sensor for measuring the yaw rate of the vehicle and providing a measured yaw rate signal;
a longitudinal speed sensor for measuring the longitudinal speed of the vehicle and providing a measured longitudinal speed signal; and
a side-slip estimation processor for estimating the side-slip of the vehicle, said processor correcting the measured longitudinal speed signal to provide a true longitudinal speed signal, defining a constant based on the measured longitudinal speed signal, and defining a function based on predetermined vehicle-dependent parameters and the measured lateral acceleration signal, said processor estimating the side-slip by combining the measured lateral acceleration signal, the measured yaw rate signal, the true longitudinal speed signal, the constant and the function.

12. The system according to claim 11 wherein the side-slip estimation processor estimates the side-slip using the equation:

$$\dot{V}_{y\_estimated} = A_{y\_measured} - r\_measured V_{x\_true} - kf(A_{y\_measured})$$

where $\dot{V}_{y\_estimated}$ is estimated side-slip acceleration, $A_{y\_measured}$ is the measured lateral acceleration signal, $r\_measured$ is the measured yaw rate signal, $V_{x\_true}$ is the true longitudinal speed signal, k is the constant and $f$ is the function.

13. The system according to claim 11 wherein the side-slip estimation processor corrects the measured longitudinal speed signal by filtering the measured longitudinal speed signal using vehicle-dependent parameters to provide a filtered longitudinal speed signal.

14. The system according to claim 13 wherein the side-slip estimation processor filters the measured longitudinal speed signal using the equation:

$$V_{\text{x\_measured\_filter}} = \frac{d}{s^2 + c_1 s + c_2} V_{\text{x\_measured}}$$

where $V_{x\_measured\_filter}$ is the filtered longitudinal speed signal, $V_{x\_measured}$ is the measured longitudinal speed signal, s is the Laplace operator and d, $c_1$ and $c_2$ are the vehicle-dependent parameters.

15. The system according to claim 13 wherein the side-slip estimation processor corrects the measured longitudinal speed signal by providing a steering angle correction to the filtered longitudinal speed signal.

16. The system according to claim 15 wherein the side-slip estimation processor corrects the longitudinal speed signal by providing a hand-wheel signal indicative of the position of a vehicle hand-wheel, ratioing the hand-wheel signal to provide a ratio signal and multiplying the ratio signal by the filtered longitudinal speed signal.

17. The system according to claim 11 wherein the side-slip estimation processor defines the function by using a first set of vehicle-dependent parameters if the measured longitudinal speed signal is below a predetermined value and using a second set of vehicle-dependent parameters if the measured longitudinal speed signal is greater than or equal to the predetermined value.

18. The system according to claim 11 wherein the side-slip estimation processor defines the function by using the equation:

$$f = \frac{b_1 A_{\text{y\_measured}} - b_2}{s^2 + a_1 s + a_2}$$

where $f$ is the function, $A_{y\_measured}$ is the measured lateral acceleration signal, s is the Laplace operator, and $a_1$, $a_2$, $b_1$ and $b_2$ are the vehicle-dependent parameters.

19. The system according to claim 11 wherein the side-slip estimation processor estimates the side-slip by multiplying the constant and the function.

20. A system for estimating side-slip of a vehicle, said system comprising:
a lateral acceleration sensor for measuring the lateral acceleration of the vehicle and providing a measured lateral acceleration signal;
a yaw rate sensor for measuring the yaw rate of the vehicle and providing a measured yaw rate signal;
a longitudinal speed sensor for measuring the longitudinal speed of the vehicle and providing a measured longitudinal speed signal;
a hand-wheel angle sensor for measuring the position of a vehicle hand-wheel and providing a hand-wheel signal; and a side-slip estimation processor for estimating the side-slip of the vehicle, said side-slip estimation processor correcting the measured longitudinal speed signal to provide a true longitudinal speed signal by filtering the measured longitudinal speed signal using vehicle-dependent parameters to provide a filtered longitudinal speed signal and correcting the filtered longitudinal speed signal to provide a steering angle correction using the hand-wheel signal, said side-slip estimation processor defining a constant based on the measured longitudinal speed signal and defining a function based on the predetermined vehicle-dependent parameters and the measured lateral acceleration signal, said side-slip estimation processor estimating side-slip acceleration of the vehicle using an equation that combines the measured lateral acceleration signal, the measured yaw rate signal, the true longitudinal speed signal, the constant and the function, wherein the equation multiplies the constant and the function.

21. The system according to claim 11 wherein the side-slip estimation processor estimates the side-slip using the equation:

$$\dot{V}_{y\_estimated} = A_{y\_measured} - r_{\_measured} V_{x\_true} - kf(A_{y\_measured})$$

where $\dot{V}_{y\_estimated}$ is estimated side-slip acceleration, $A_{y\_measured}$ is the measured lateral acceleration signal, $r_{\_measured}$ is the measured yaw rate signal, $V_{x\_true}$ is the true longitudinal speed signal, k is the constant and $f$ is the function.

22. The system according to claim 13 wherein the side-slip estimation processor filters the measured longitudinal speed signal using the equation:

$$V_{x\_measured\_filter} = \frac{d}{s^2 + c_1 s + c_2} V_{x\_measured}$$

where $V_{x\_measured\_filter}$ is the filtered longitudinal speed signal, $V_{x\_measured}$ is the measured longitudinal speed signal, s is the Laplace operator and d, $c_1$ and $c_2$ are the vehicle-dependent parameters.

23. The system according to claim 11 wherein the side-slip estimation processor defines the function by using the equation:

$$f = \frac{b_1 A_{y\_measured} - b_2}{s^2 + a_1 s + a_2}$$

where $f$ is the function, $A_{y\_measured}$ is the measured lateral acceleration signal, s is the Laplace operator, and $a_1$, $a_2$, $b_1$ and $b_2$ are the vehicle-dependent parameters.

24. The system according to claim 11 wherein the side-slip estimation processor defines the function by using a first set of vehicle-dependent parameters if the measured longitudinal speed signal is below a predetermined value and using a second set of vehicle-dependent parameters if the measured longitudinal speed signal is greater than or equal to the predetermined value.

* * * * *